Sept. 21, 1948. D. JAUHIAINEN 2,449,941
EGG SHELL REMOVER
Filed April 25, 1947

INVENTOR.
Donald Jauhiainen,
BY Victor J. Evans & Co.
ATTORNEYS

Patented Sept. 21, 1948

2,449,941

UNITED STATES PATENT OFFICE 2,449,941

EGGSHELL REMOVER

Donald Jauhiainen, Iron River, Mich.

Application April 25, 1947, Serial No. 743,932

1 Claim. (Cl. 146—2)

1

This invention relates to an egg shelling device.

It is an object of the present invention to provide an egg shelling device adapted to pick eggs from boiling water and to shell them by the application of air pressure injected from an air bulb into the shell to divide and spread the same from the egg.

Other objects of the present invention are to provide an egg sheller which is of simple construction, inexpensive to manufacture and efficient in operation.

For other objects and for a better understanding of the invention, reference may be had to the following detailed description taken in connection with the accompanying drawing, in which Fig. 1 is a side elevational view of the egg shelling device extended over the ends of the egg and prior to the same having been separated from its shell.

Figure 1:
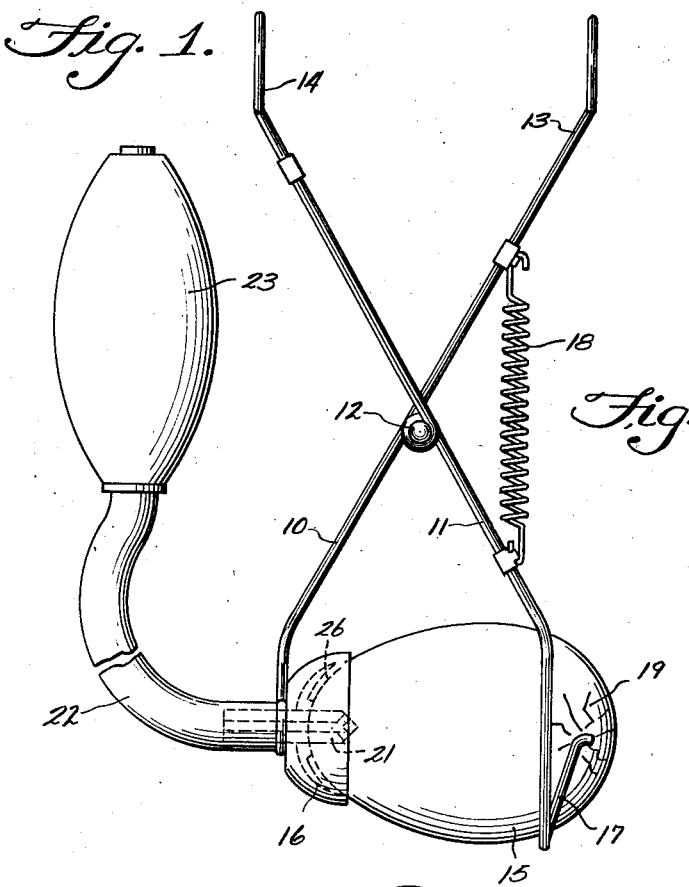
Figure 2:
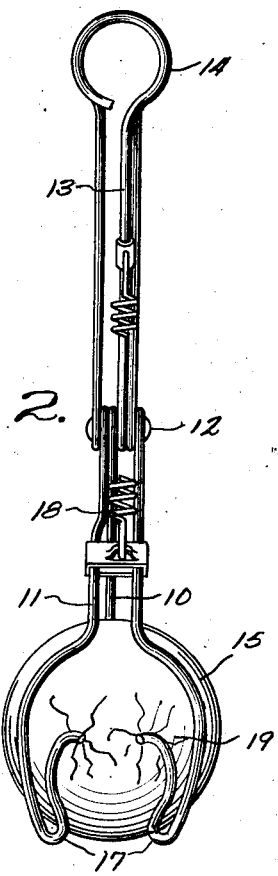
Fig. 2 is an end elevational view of the egg sheller.
Figure 3:
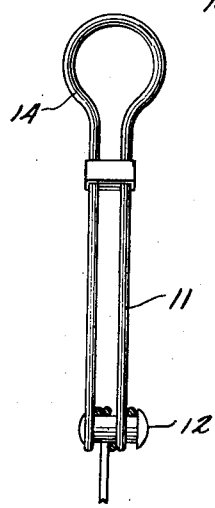
Fig. 3 is a fragmentary end elevational view looking upon the opposite end of the egg sheller and upon the handle portion thereof.
Figure 4:
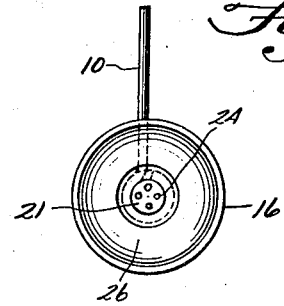
Fig. 4 is a fragmentary end elevational view looking upon the egg nozzle as viewed on line 4—4 of Fig. 1.
Figure 5:
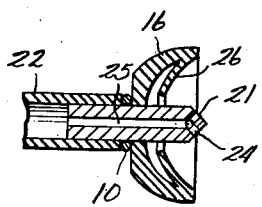
Fig. 5 is a cross-sectional view taken through the nozzle and on line 5—5 of Fig. 1.

Referring now to the figures, 10 and 11 represent tong elements pivoted to one another as indicated at 12 and respectively having handle portions 13 and 14 adapted to be squeezed together to retain an egg 15 between a cup formation 16 on the tong 10 and a wire prong arrangement 17 on the tong 11. A spring 18 is extended between the tongs to normally keep them separated from one another. As pressure is applied to handle portion, the nozzle 17 will split one part of the egg as indicated at 19 and a nozzle 21 which is in the cup shaped member 16 will be extended into the bottom of the egg 15. This nozzle extends rearwardly and has a portion in rear of the tong 10 to which an air hose 22 with a bulb 23 thereon is connected. When air pressure is applied by the bulb 23, the egg will be inflated and the shell will be separated from the white part of the egg.

The cup shaped member 16 fits about the nozzle 21. The nozzle has four jet openings 24 therein directed in different directions whereby air will be evenly distributed to the different sides of the egg. These jet openings 24 communicate with a central passage 25 within the nozzle 21.

The cup shaped member 16 is of flexible material such as rubber and has radially inwardly extending flap adapted to rest upon the shell surface to provide a better engagement therewith and to held prevent air from escaping around the exterior of the cup shaped member. This flap is indicated at 26.

Having now described my invention, I claim:

An egg shell remover comprising tongs, shell-breaking prongs formed integrally with one tong member, a hollow egg-piercing spear carried by the other tong member, a resilient bulb, a tube interconnecting the bulb and the spear, a cup-shaped member of flexible material surrounding the spear and having a radially inwardly extending flexible flap adapted to engage with an egg shell whereby to prevent the escape of air from the cup-shaped member.

DONALD JAUHIAINEN.

REFERENCES CITED

The following references are of record in the file of this patent:

UNITED STATES PATENTS

| Number | Name | Date |
|---|---|---|
| 77,140 | Walters | Apr. 21, 1868 |
| 963,407 | Uhlir | July 5, 1910 |
| 1,618,682 | Snapp | Feb. 22, 1927 |
| 2,247,016 | Halas | June 24, 1941 |